Figure 1:
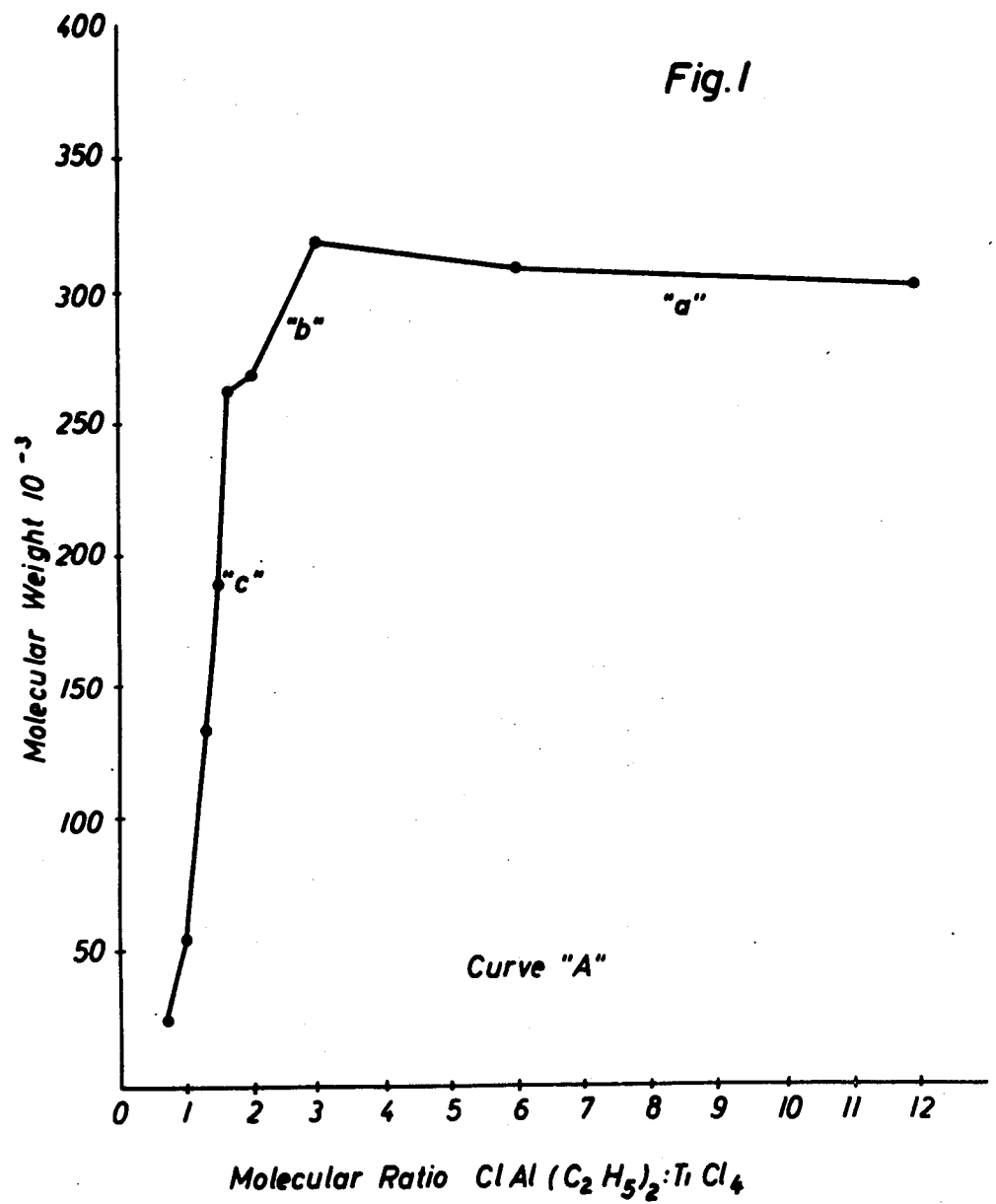

United States Patent [19]

Ziegler et al.

[11] 4,125,698

[45] Nov. 14, 1978

[54] POLYMERIZATION OF ETHYLENICALLY UNSATURATED HYDROCARBONS

[75] Inventors: Karl Ziegler; Heinz Breil; Heinz Martin; Erhard Holzkamp, all of Mulheim an der Ruhr, Germany

[73] Assignee: Studiengesellschaft Kohle M.b.h., Mulehim, an der Ruhr, Germany

[21] Appl. No.: 770,484

[22] Filed: Oct. 29, 1958

Related U.S. Application Data

[63] Continuation of Ser. No. 482,412, Jan. 17, 1955, abandoned, and Ser. No. 527,413, Aug. 9, 1955, abandoned, and Ser. No. 514,068, Jun. 8, 1955.

[30] Foreign Application Priority Data

| Nov. 17, 1953 | [DE] | Fed. Rep. of Germany | Z 3799 |
| Dec. 15, 1953 | [DE] | Fed. Rep. of Germany | Z 3862 |
| Dec. 23, 1953 | [DE] | Fed. Rep. of Germany | Z 3882 |
| Jan. 19, 1954 | [DE] | Fed. Rep. of Germany | Z 3941 |
| Aug. 3, 1954 | [DE] | Fed. Rep. of Germany | Z 4348 |
| Aug. 16, 1954 | [DE] | Fed. Rep. of Germany | Z 4375 |
| Dec. 11, 1954 | [DE] | Fed. Rep. of Germany | Z 4603 |
| Dec. 13, 1954 | [DE] | Fed. Rep. of Germany | Z 4604 |

[51] Int. Cl.$^2$ .......................... C08F 4/66; C08F 10/00

[52] U.S. Cl. ...................... 526/159; 526/95; 526/103; 526/105; 526/107; 526/164; 526/169.1; 526/169.2; 526/352; 526/906

[58] Field of Search .............. 260/94.9, 93.7; 526/159, 169, 103, 95, 105, 107, 169.1, 169.2, 164

[56] References Cited

U.S. PATENT DOCUMENTS

| 3,058,963 | 10/1962 | Vandenberg | 526/159 |
| 3,114,743 | 12/1963 | Horne | 526/159 |

Primary Examiner—Edward J. Smith
Attorney, Agent, or Firm—Burgess, Dinklage & Sprung

[57] ABSTRACT

Method for the polymerization of alpha-olefins, e.g., ethylene and its higher homologs, to produce high molecular weight polymers by contacting the alpha-olefin or an alpha-olefin mixture to be polymerized with a catalyst formed from a mixture of a first and second component, the first component essentially consisting of a dialkyl, diaryl organoaluminum compound, or aluminum hydride, and preferably a dialkyl aluminum halide, e.g., diethyl aluminum chloride, and the second component essentially consisting of a salt, freshly precipitated oxide or hydroxide of a Group IVB, VB, VIB or VIII of the Periodic System, and most preferably a salt, such as titanium chloride.

15 Claims, 5 Drawing Figures

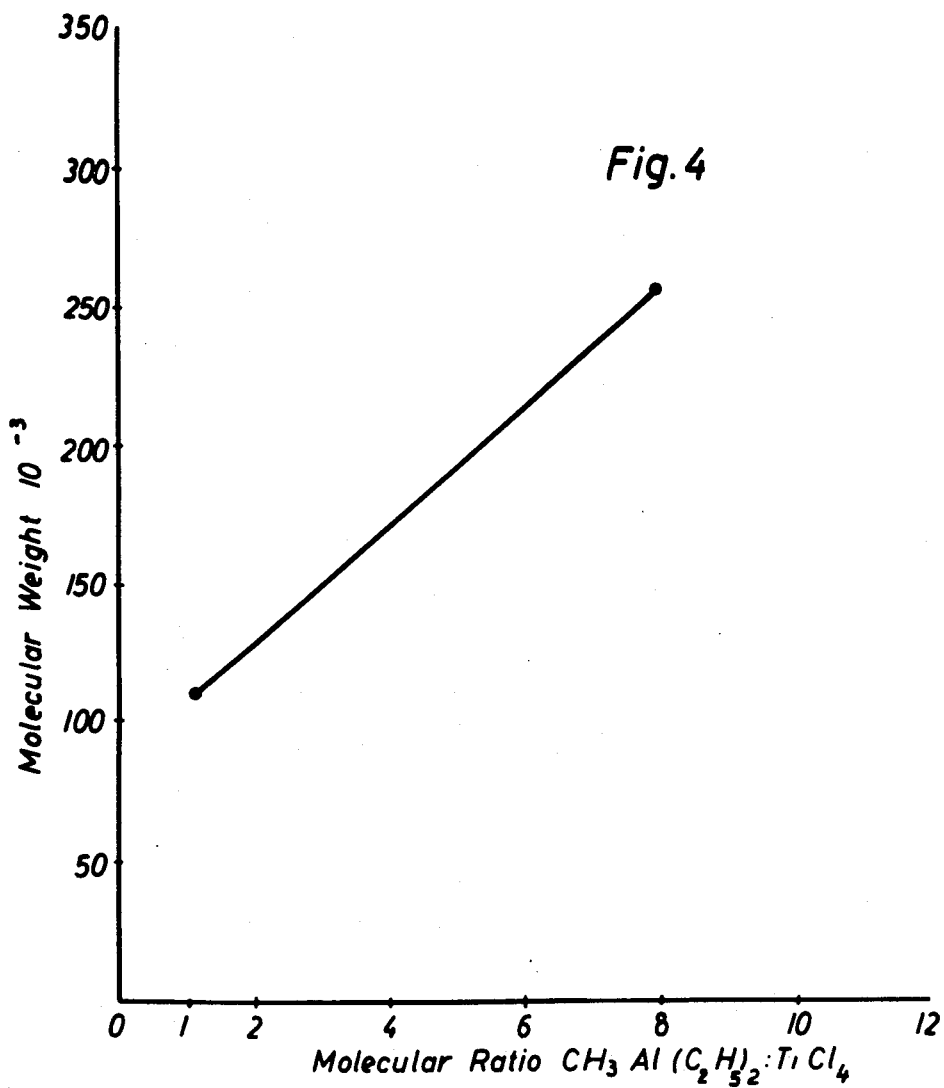
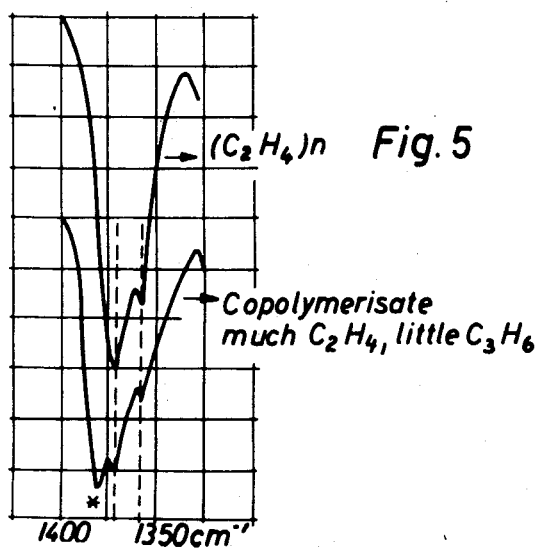

POLYMERIZATION OF ETHYLENICALLY UNSATURATED HYDROCARBONS

This invention relates to new and useful improvements in the polymerization of ethylenically unsaturated hydrocarbons for the production of high molecular polymers and is a continuation of copending applications Ser. No. 482,412 filed Jan. 17, 1955, now abandoned Ser. No. 527,413 filed Aug. 9, 1955, now abandoned, and Ser. No. 514,068 filed June 8, 1955.

The polymerization of olefins for the production of polymers ranging from gaseous through solid polymers is well known. When producing solid polymers from olefins such as gaseous ethylenes, high pressures of, for example, 1,000 atmospheres and more were generally required, and oxygen or peroxides were generally used as the polymerization catalyst. The yields obtained by these conventional methods were generally low with, for example, about 15 – 20% of the ethylene being converted in a single operation into the polyethylene. The highest polyethylene polymer which could be effectively obtained by the prior known methods had a molecular weight of about 50,000.

Another type of polymerization catalyst which has been proposed to polymerize olefins such as ethylene consists of aluminum hydrides, aluminum trialkyls or aluminum triaryls. The polymerization reaction involved in that trialkyls however, normally produces low moledular polymers not ranging substantially above the liquid range. By using extremely small, controlled amounts of the aluminum catalyst it is possible to obtain higher molecular products. With the use of such small quantities of the aluminum catalyst, however, the reaction becomes extremely sensitive to traces of impurity in the olefins such as ethylene and proceeds very slowly since the quantity of catalyst to the total reaction mixture is very small.

One object of the invention is a new process for polymerizing ethylenically unsaturated hydrocarbons.

Another object of this invention is a new process for polymerizing ethylene into high molecular polyethylenes which may be used as plastics.

A further object of this invention is a new process for the polymerization of ethylene into high molecular polyethylenes with a higher yield than heretofore obtainable.

A still further object of the invention is the polymerization of ethylene into polyethylenes having molecular weights higher than those heretofore obtainable.

These and still further objects will become apparent from the following description:

In accordance with the invention at least one ethylenically unsaturated hydrocarbons of the general formula $CH_2=CHR$ is polymerized into high molecular products by contact with a catalyst composed of a mixture of a first and second component, said first component being at least one aluminum compound of the group consisting of aluminum hydrides and mono- and dihydrocarbon aluminum compounds, having the general formula $R_2'AlX$ in which $R'$ is the same or a different member selected from the group consisting of hydrogen, alkyl radicals and aryl radicals, and X is a member selected from the group consisting of hydrogen, alkyl radicals, aryl radicals, halogen atoms, alkoxy radicals, aryloxy radicals, secondary amino radicals, secondary acid amide radicals, mercapto radicals, thiophenyl radicals,

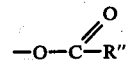

radicals, and $-O-SO_2-R'$ radicals, said second component being a heavy metal compound selected from the group consisting of the non-ionized salts including organic salts, and the freshly precipitated oxides and hydroxides of metals of groups IV-B, V-B and VI-B of the Periodic System including thorium and uranium. R in said formula may be hydrogen or a hydrocarbon radical.

The designation aryl or similar expression as used herein generically, in identification or an organic compound, is intended to include, as is well understood in the art, an organo compound having one or more aryl, aralkyl or alkylaryl substituents.

The term "non-ionized salt" as used herein is intended to designate the true salt as such and which under the conditions of the formation of the catalyst mixture and the contacting with the ethylenically unsaturated hydrocarbon is not reduced to free metal and is not ionized.

Except as otherwise limited herein, the term "salt" or "salts" designating a compound having a heavy metal of the IV-B, V-B and VI-B groups of the Periodic System, including thorium and uranium, is employed in its broadest sense, i.e. to connote the reaction product between a base and an acid, including products of the type of acetylacetonates and further including salts in which said periodic system group member is present as a cation as well as those in which such member is present as an anion such as in products of the type of titanates, zirconates, chromates, molybdates or tungstates. The term "pure alcoholates" hereafter used in designation of the said "salts" is intended to connote "salts" having solely alcoholate radicals attached to said heavy metal. "Mixed alcoholates" of said heavy metals as hereafter referred to are such salts having at least one alcoholate radical and at least one nonalcoholate radical.

Particularly good results are produced with heavy metal compounds which are soluble in inert organic solvents such as hydrocarbons.

Using the catalyst in accordance with the invention for the polymerization of olefins such as gaseous ethylene, the same are polymerized into high molecular polymers by contact with the catalyst. The catalyst may be formed by mixing, for example, aluminum hydride, aluminum dialkyl- or aluminum diaryl compounds with a compound of a metal of group IV-B, V-B, or VI-B of the Periodic System of Elements.

When the aluminum compounds comprise dialkyl or diaryl aluminum monohalides, a compound of a metal of the VIII$^{th}$ Group of the Periodic System or of manganese may be used in place of the Group IV-B, V-B, or VI-B metal compounds.

The term "high molecular" as used herein is intended to designate molecular weights of more than 2,000, and preferably more than 10,000.

The herein designated numerical values for molecular weights are based, in accordance with conventional practice, on the viscosity of the solutions of the polyethylene for which the molecular weight determination is to be made. This viscosity is expressed as "intrinsic viscosity" ($\eta$) which is to be calculated on the basis of an equation given by Schulz and Blaschke (Journal für Praktische Chemie, Volume 158 (1941) pp. 130–135, equation 5b p. 132) and corrected for the therein mentioned specific viscosity according to Fox, Fox and Flory (J.Am.Soc. 73 (1951) p. 1901). The average molecular weight, as for instance that of 50,000 above given, is calculated from such intrinsic viscosity by way of the modified equation of R. Houwink (Journal für Praktische Chemie, new Edition, 157 (1940) pp. 15–16 equation 5):

$$\overline{MW} = Kx\,(\eta)^a$$

for which the constant $K = 2.51 \times 10^4$
and the constant $a = 1.235$
On the basis of molecular weights calculated in this manner, polyethylenes having molecular weights of 300,000 up to 3,000,000 and more may be obtained in accordance with the invention.

In general a suitable aluminum hydrocarbon compound is preferably one in which the hydrocarbon substituent possesses from 0 to 1 and more aromatic hydrocarbon rings of form $C_6$ to $C_{10}$, i.e., the benzene and naphthalene rings.

The starting aluminum compound which may be used in forming the catalyst in accordance with the invention have the general formula $R_2'AlX$, in which $R'$ is hydrogen or a hydrocarbon radical, such as an alkyl or aryl radical, and X is hydrogen, a halogen atom, an alkoxy radical, an aryloxy radical, a secondary amino radical, i.e. the radical of a secondary amine, a secondary acid amide radical, a mercapto radical, a thiophenyl radical, an

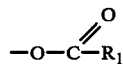

radical, or an $-OSO_2R_1$ radical, in which $R_1$ is a hydrocarbon radical. Further, when $R_2'$ is hydrogen, X may designate a hydrocarbon radical such as an alkyl or aryl radical. In the formula $R_2'AlX$, radicals $R'$ and X are to aggregate from 0 to 2 hydrocarbon radicals. This excludes, therefore, aluminum tri-hydrocarbons which in combination with the group IV-B - VI-B, heavy metal compounds, are set forth in copending applications, Ser. No. 692,020, filed Nov. 26, 1957, issued to U.S. Pat. 3,574,138 as of Apr. 6, 1971 and Ser. No. 745,998 filed July 1, 1958, now abandoned.

Examples of aluminum compounds which may be used in accordance with the invention include:

| Aluminum hydride | $AlH_3$ |
|---|---|
| Alkyl or arylaluminumdihydrides | $RAlH_2$ |
| Dialkyl or diarylaluminumhydrides | $R_2AlH$ |
| Dialkyl or diarylaluminum-monohalides | $R_2AlHalogen$ |
| Dialkyl or diarylaluminumalkoxy or aryloxy compounds | $R_2Al(OR)$ | in which R represents an aliphatic or aromatic hydrocarbon radical.

Of these compounds, the dialkyl and diaryl aluminum monohalides have been found preferable. Suitable halides are: chlorides, bromides, iodides, and fluorides.

Examples of radical which may represent X in the general formula above include:

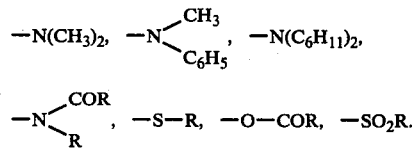

As used herein, $C_6H_{11}$ is intended to designate the cyclohexane radical.

In accordance with the invention certain novel aluminum compounds have been found which fall under the general formula and thus may be used as starting aluminum compounds for forming catalysts in accordance with the invention. Examples of these compounds include:

| | Substance | MP ° C | BP ° C/p (mm Hg) | Characteristics |
|---|---|---|---|---|
| 1) | $H_5C_2\!\!>\!\!Al-O-\!\!\bigcirc$ ($H_5C_2$) | 35/6 | $90/10^{-3}$ | Colorless crystals |
| 2) | $H_5C_2\!\!>\!\!Al-O-$naphthyl ($H_5C_2$) | 65 | $190/10^{-3}$ | Colorless rosette-shaped crystals |
| 3) | $H_5C_2\!\!>\!\!Al-N(CH_3)_2$ ($H_5C_2$) | 5–6 | 66/0.15 | d=0.87 Colorless slightly mobile liquid |
| 4) | $H_5C_2\!\!>\!\!Al-N$(cyclohexyl) ($H_5C_2$) | 44/5 | $95/100/10^{-3}$ | Colorless crystals |
| 5) | $H_5C_2\!\!>\!\!Al-N(CH_3)(C_6H_{11})$ ($H_5C_2$) | 100/1 | $145/5.10^{-4}$ | Colorless crystals |
| 6) | $H_5C_2\!\!>\!\!Al-N(C_6H_{11})_2$ ($H_5C_2$) | abs. 165 | — | Distills with decomposition Colorless crystals |
| 7) | $H_5C_2\!\!>\!\!Al-N(CH_3)(C_6H_5)$ ($H_5C_2$) | 61–62 | $130/10^{-3}$ | Decomposes taking on a brown color in air |

-continued

| | Substance | MP °C | BP °C/p (mm Hg) | Characteristics |
|---|---|---|---|---|
| 8) | (cyclic structure: $H_5C_2$—Al—N with ring containing C=O, $H_2$, $H_2$, $H_2$, $H_2$; $H_5C_2$ on Al) | — | — | oily liquid (yellowish) |
| 9) | $H_5C_2$\Al—S—$C_2H_5$ / $H_5C_2$ | — | 160/2 12 mm Hg | Colorless easily mobile liquid |
| 10) | $H_5C_2$\Al—O—CO—$CH_3$ / $H_5C_2$ | 30 | $73\text{-}4/5 \cdot 10^{-4}$ | Syrup, which slowly becomes entirely crystalline at room temperature. |
| 11) | $H_5C_2$\Al—O—CO—$C_6H_5$ / $H_5C_2$ | — | $130/5^{x)}/10^{-3x)}$ | $^{x)}$with decomposition Colorless crystals |
| 12) | $i\text{-}H_9C_4$\Al—O—CO—$C_6H_5$ / $i\text{-}H_9C_4$ | 58 | — | Colorless crystals |

The starting aluminum compounds in accordance wih the invention need not be completely pure or homogenous. Crude products or solutions obtained in the course of the preparation of these compunds may be used. Furthermore, the polymerization catalyst may be prepared using mixtures of the aluminum compounds in accordance with the invention. Thus, for example, such catalysts can be prepared using the so-called alkyl-aluminum-sesquihalides, i.e. mixtures of compounds $R_2AlHalogen + RAl(Halogen)_2$, as may be obtained by dissolving metallic aluminum in halogen alkyls.

The heavy metal catalyst component useful in accordance with the invention may be any compound of a metal on the left hand side of the IVth to VIth Groups of the Periodic System, including thorium and uranium. In certain of the newer Periodic Charts of the Elements, these metals on the left hand side of the IVth to VIth Groups of the Periodic System are designated as Groups IV-B, V-B and VI-B respectively. The term "heavy metal" is used herein in contrast with the relatively lighter metal Al. When reference is made herein and in the claims to metals of Groups IV-B, V-B and VI-B of the Periodic System, there is intended any member of these groups, including thorium and uranium, as for example, titanium, zirconium, hafnium, thorium, uranium, vanadium, niobium (columbium), tantalum, chromium, molybdenum and tungsten.

Any compound of these metals such as the halogenides, for example chlorides or bromides, oxyhalogenides, for example oxychlorides, complex halogenides, for example, complex fluorides, freshly precipitated oxides or hydroxides or organic compounds, for example pure alcoholates of the type of esters such as titanium-, zirconium- etc. tetrabutyl esters, mixed alcoholates, acetates, benzoates or acetayl acetonates and similar compounds may be used. Also mixed compounds, as for example of the type of mono-, di- or tri halogeno (preferably chloro-) alcoholates of said heavy metals may be used. Salts of titanium, zirconium, uranium, thorium and chromium have been found to be preferable.

A particularly active catalyst in accordance with the invention may be obtained, for example, by mixing a titanium or zirconium compound, such as a tetrachloride, oxychloride or acetyl acetonate with the herein specified organo aluminum compound.

With the use of these catalysts it is possible to rapidly convert for instance ethylene into a high molecular polyethylene at pressures of less than 100 atmospheres and temperatures below 100° C.

If the starting aluminum compounds are dialkyl or diaryl aluminum monohalides, it is possible to use a compound of a metal of the VIIIth Group of the Periodic System or manganese to form the catalyst in place of or in additin to the compounds of the IV-B to VI-B metals.

The catalyst is formed by merely mixing the starting aluminum compound and the metal compound of the metal of Group IV-B to VI-B or, where applicable, the compound of the metal of the VIIIth Group or manganese. The mixing may, for example, be effected in a solvent as, for example, hexane.

The exact nature of the catalyst produced by the mixing of the metal compound of Group IV-B to VI-B and the organo metal compound is not known. It is believed that the heavy metal compound is converted to a lower valency form. Thus, for example, upon bringing together the tetravalent zirconium compound and a dialkyl aluminum halide, there is formed a compound of monovalent, bivalent or trivalent zirconium. The fact that the quadrivalent zirconium salt undergoes a conversion may be clearly noted from the fact that the initially colorless salt dissolves in metal alkyl, becoming darker in color and generating heat. While the special polyermizing action of the catalyst in accordance with the invention may come from the combination with the organo metal compound, probably the low valence group IV-B, or V-B or VI-B metal compound has a high polymerization effect by itself, since for example the action of the metal alkyl derived catalyst on ethylene starts at a lower temperature and takes place more rapidly than the normal reaction of such alkyl with ethylene.

Within the broadest concept of the invention the ratio of organo metal compound (including any halide) to heavy metal compound is not critical with respect to the obtaining per se of high molecular polymers such as exemplified by polyethylenes with molecular weights from 10,000 to 3,000,000 and higher. Expressed in mol ratios they may run from fractions, as for example 0.1, or even less, to multiples of 1, such as 12 or higher, of organo metal compound/heavy metal compound. In the event that the heavy metal compound is a true alcoholate, it is preferable to utilize a mol ratio of organo metal compound/heavy metal compound of at least about 10:1 since such alcoholates will also produce dimers and the dimerization is increasingly favored with decreasing mol ratios.

Whenever the primary objective is to assure that particularly high molecular weights are secured for the polymer produced by use of the catalyst in accordance with the invention, or when oxidizing impurities, as for example moisture or oxygen, are present, such as in ethylene, or in any solvent, it is preferred to utilize an excess of organo metal compound. In that case it is of advantage to use at least 2 mols of the organo metal compound for each mol of heavy metal compound regardless of its valence and preferably, in the case of heavy metal compounds other than acetyl acetonates, $2n$ to $3n$ mols of the organo metal compound to every mol of the heavy metal compound, "$n$" being the valence of the heavy metal.

A typical illustration of such mol ratios is for instance a combination composed of one mol of a tetravalent titanium salt such as $TiCl_4$ and 8-12 mols of organo metal compound. The reasons for the desirability of an excess of this compound, in the event of, for example, the presence of oxidizing impurities, are based on the following considerations:

When the organo metal compound acts for instance on the tetravalent titanium salt, a reduction takes place which, however, does not reduce the titanium to metallic titanium. If the organo metal compound reacts at first only with one of its hydrocarbon radicals such as an alkyl, as for instance an ethyl group as is true in general for the reactivity of these organo metal compounds, not more than three molecules of organo metal compound will presumably be consumed in the reduction of the tetravalent titanium salt. An excess of organo-aluminum component beyond that serving for preparing the catalytically effective material is then normally present when using the above referred to multiple mol amounts specified for heavy metal compound combinations other than acetylacetonates. The excess of organo metal compound is of value to counteract the oxidizing action of impurities frequently present when utilizing the catalyst. Thus in ethylene there may be present, for example, moisture or oxygen which oxidize the air sensitive catalysts and thus impair their activity. The excess of the organo metal compound prevents this oxidation or reduces the already oxidized catalyst to eliminate impurities possibly present in the ethylene.

The minimum quantities of the catalysts in relation to monomer, for example olefin such as ethylene, may vary within very wide limits and are dependent upon the purity of the material to be polymerized. When using for instance very pure ethylene, 0.1 parts of catalyst to 1,000 parts of ethylene will already be sufficient. It is evident that larger quantities can be used even in the case of pure ethylene. However, it is desirable to avoid using unnecessarily large quantities of catalyst so as not to make the working up process more difficult than is necessary. Taking very impure monomer, such as ethylene, good results can nevertheless be obtained with quantities of catalysts amounting to only a few percent. If solvents are used for the polymerization, the same applies in connection with the purity of the solvents. The quantities of catalysts employed influence the molecular weight of the polymers produced so that the degree of polymerization and thus the molecular weight will be higher the smaller the quantity of catalysts employed. On the other hand the higher the catalyst concentration the lower will be the molecular weight.

The influencing of the molecular weight however by altering the concentration of the catalyst, has its limitations, in that an increase in the catalyst concentration leads to an increased consumption of catalyst and this makes the process more expensive. In addition, the polymers obtained with high catalyst concentrations contain more ash than those made with low catalyst concentrations and must have this ash removed therefrom by complicated lixiviation or washing with solvents. On the other hand, when the catalyst concentration is considerably reduced for the purpose of raising the molecular weight, the reaction velocity of the polymerization is appreciably reduced and consequently also the yield per unit of volume and time. Moreover, the control of molecular weight by variation of catalyst concentration cannot readily be applied to the range of molecular weights below 100,000, which is a particularly important range in practice.

Within the scope of one embodiment of the instant invention it is possible to obtain for the polymers, variations in molecular weight in a manner avoiding or at least appreciably minimizing some or all of the disadvantages entailed by variation in catalyst concentration and to secure benefits not obtainable by the latter method. This embodiment is based on the discovery that for catalyst combinations usable in accordance with the invention, variations in mol ratios of organo metal compound/heavy metal compound will produce different molecular weight polymers. Broadly speaking, lower mol ratios will yield lower molecular weight products and higher mol ratios will give higher molecular weight products. It is thus possible for any given catalyst combination to obtain polymers of predetermined molecular weights by selecting specific predetermined mol ratios for that combination.

The mol ratio variation effect is in each case readily ascertainable from the curve or graph obtained when plotting different mol ratios of given catalyst combinations, useful in accordance with the invention, against the respective molecular weights of the polymers obtained by the use of these given combinations. Such curves or graphs are for instance illustrated in the accompanying drawing. They show the easy securability of any desired molecular weight by selecting the appropriate mol ratio.

It has been further found that each organo metal compound/heavy metal compound mol ratio versus molecular weight curve for any given catalyst combination, useful in accordance with the invention possesses a relatively "steep" (inclining) portion for which the pitch is greater than the pitch of other portions of the same curve. In many cases the "steep" portion of the curve is additionally characterized by the fact that its pitch corresponds to a greater change in molecular weight for each increase of one mol ratio or less than any section of any other and particularly succeeding curve portion inclining in the direction of increasing mol ratios.

As will be seen in accordance with the foregoing and the more specific exemplification by the illustrated graphs hereafter more fully discussed, the "steep" portion of the mol ratio versus molecular weight curve defines for relatively small increments in mol ratio relatively large increments in molecular weight.

The curve portions adjacent the "steep" portion, i.e. those immediately following and those immediately preceeding the above identified "steep" portion of the graph, defining mol ratio versus molecular weight, in accordance with the invention, may also show for relatively small changes in mol ratio relatively large variations in molecular weight. Whereas the "steep" curve portions normally show molecular weight increases with rising mol ratios of catalyst, the "adjacent" curve portions, may comprise a portion or may be composed of sections in which increments in mol ratios produce decreases in molecular weights. Though the "preceeding" curve portion may exhibit a lesser change in molecular weight than is the case for the curve portion succeeding the "steep" portion, the former may offer nevertheless appreciable advantages. Thus, such "preceeding" curve portion within the range of molecular weights, controlled thereby permits the selection of mol ratios requiring a comparatively small amount of the, in many instances, relatively expensive, and in higher concentrations more difficult to handle organo metal compounds. Within the preferred scope of this embodiment of the invention there are included the "steep" portion of the mol ratio versus molecular weight curve as well as its adjacent lower and upper curve portions showing for relatively small changes in mol ratios relatively large changes in molecular weight. This preferred range is designated in accordance with the invention as the "sensitive range." If the primary consideration is to accomplish savings in organo metal compound material it is of advantage to select that portion, and preferably initial portion, of the mol ratio versus molecular weight curve which in the direction of increasing mol ratios ends (as part thereof) with the relatively "steep" (inclining) portion thereof. Because of the obvious advantages, however, offered by the steeply pitched portion of the curve or graph, the preferred range of the mol ratio versus molecular weight curve is normally represented by the "steep" portion thereof as hereinabove defined.

Inasmuch as increasing mol ratios mean relative decrease in heavy metal compounds which may be in some cases more expesnive than some of the more readily available organo metal compounds, the sensitive range also permits the determination for selection of a desired molecular weight with the least amount of heavy metal compounds. Further the sensitive range permits in all cases the determination of the highest molecular weight at the most economical mol ratio of materials. Above all, however, the sensitive range and especially the "steep" curve portion thereof permits the obtaining of any desired predetermined molecular weight furnishing therefor predeterminately fixed ratio of catalyst components within a relatively narrow range of adjustment to cover a very wide and in many cases, the entire molecular weight range obtainable for a particular catalyst and condition of polymerization.

Polymerization with the catalysts in accordance with the broad and generic scope of invention is effected by merely contacting the material to be polymerized with the above described catalyst. This may be carried out under reaction conditions generally considered and conventionally termed in the art as "mild" reaction conditions (as to temperature and pressure). The contacting may be effected at normal or up to about 10 atmospheres pressure or at comparatively low pressures of about 10 - 100 atmospheres; the contacting pressure is not critical and a smooth polymerization may be effected at atmospheric or sub-atmospheric pressures. On the other hand, the action of the new catalyst remains fundamentally unchanged, even if the pressure is increased to any desired obtainable value. It is advantageous to work at pressures of 1 to 10 atmospheres. It is an outstanding advantage of the invention that one may operate at ordinary atmospheric pressure with excellent results.

The monomer may be added in vapor phase which is of particular advantage when using normally gaseous olefins such as ethylene. Previously known high pressure ethylene polymerization processes have the further disadvantage that ordinarily only a relatively small proportion of approximately 15 to 20% of the ethylene introduced is converted into polyethylene. On the other hand, ethylene treated with a catalyst in accordance with the invention is predominantly converted. Moreover, the ethylene to be employed with the catalyst of the invention need not be so pure as in the known high pressure processes.

The temperature of the contacting is not critical and the same may be effected at room temperature or below. It is advantageous to operate at somewhat elevated temperatures and particularly above about 50° C.

Thus, in olefin polymerization, as contrasted to prior art processes, the monomer contacted with a catalyst in accordance with the invention may be rapidly converted into high molecular polymer even at low pressures of less than 100 atmospheres and temperatures of less than 100° C. Working at temperatures above 250° C. is not advisable because at this temperature the catalysts may decompose to a considerable extent.

In the practical application of the invention it is also possible to contact the novel catalyst material with several ethylenically unsaturated hydrocarbons to thereby obtain copolymerization. Thus a mixture of olefins such as an ethylene containing gas mixture may be directly used for the polymerization, for example, gases which are generated during the cracking of saturated hydrocarbons, such as ethane or propane, or from mineral oil or its fractions, or generated during similarly conducted Fischer-Tropsch syntheses; if desired they may be freed from other olefins than those desired for the polymerization. The activity of the catalyst and the degree of polymerization of the final substances obtained are dependent upon the metal compounds selected, the manner of its preparation and the ratio of the quantity of the heavy metal compound to the quantity of the organo metal compound, the latter determining largely the degree of polymerization as above set forth.

Thus, it has been found, that, when using sufficient quantities of the Group IV-B to VI-B metal containing components of the catalyst, titanium-containing catalysts are more active than zirconium-containing catalysts. The activity of the catalyst can be further substantially increased by uaing for the preparation, instead of a relatively low molecular aluminum hydrocarbon or halogeno hydrocarbon, one having larger hydrocarbon radicals.

It is in many cases preferred to operate in the presence of solvents. This is also advantageous for copolymerization of different olefins. The solvents should not dissociate or promote the dissociation of the heavy metal compound and particularly the heavy metal salts. Accordingly solvents having a high dielectric constant such as water, methyl alcohol or the like should not be used. Such solvents furthermore tend to destroy the organo metal compounds. Suitable non-dissociating or destroying solvents are: aliphatic and hydroaromatic hydrocarbons, such as pentane, hexane, cyclohexane, tetrahydronaphthalene, decahydronaphthalene, higher paraffins, also in mixtures; paraffins liquid at the reaction temperature; aromatic hydrocarbons, such as benzol, xylol; halogenated aromatic hydrocarbons, such as o-dichloro-benzol, chlorinated naphthalene; ethers such as di-butyl-ether, dioxane, tetrahydrofurane. These solvents are used in such quantities that it is still possible to stir the reaction mixture even when it is nearing the end of the reaction. Generally this stirring operation is possible even when the reaction mixture, as in the case of ethylene, contains 10 to 40% polyethylene at the end of the reaction. Maximum limits only exist as regards the economy of the process.

Polyethylenes obtained by use of the catalyst in accordance with the invention, as has been set forth above, have an extremely high molecular weight which may range up to 3,000,000 and more. These new polyethylenes have a softening point or melting point, which will be generically referred to herein as the softening point, of more than 130° C. and are insoluble in all solvents at room temperature. Polyethylenes produced in accordance with the invention, having a molecular weight up to about 100,000 will in most solvents only partially dissolve at a temperature above about 70° C., while those having a molecular weight above 100,000 will only partially dissolve in such solvents at temperatures above about 100° C. The temperature stability or resistance of the polymers, such as polyethylenes, is greater than that of the known conventional polyethylenes. Upon heating the products to temperatures above 250° C., they retain their white color, while the color of the previously known products changes to gray between 200° and 250° C. The resistance of the polymers resulting from the invention, such as polyethylenes to oxidation by atmospheric oxygen is also much greater.

Polymers, such as polyethylenes obtained in accordance with the invention have a high crystal content which is unusual for high molecular hydrocarbons. The degree of crystallization, as shown by X-ray diagrams, generally amounts to 80% and in many cases even higher. At times also lower values mayy occur. The crystallinity remains unchanged to a temperature of 100° C. or higher and disappears only near the softening point.

The polymers, such as polyethylenes are almost completely linear in molecular structure and have practically no branched chains. In general, the percentage of the methyl groups is relatively small, being at most about 0.03% and in some cases even less than 0.01%. Infra-red spectrographs of polymers obtained in accordance with the invention do not show the characteristic methyl band of prior known products.

The tear strength of, for instance, polyethylenes obtained in accordance with the invention is a minimum of about 100 kilograms per square centimeter, and frequently more than about 200 kilograms per square centimeter. The tensile strength in undrawn condition is more than about 200 kilograms per square centimeter and in elongation-oriented films or sheets, up to about 3,000 kilograms per square centimeter.

The products may be worked directly, for example, between heated plates, into clear, transparent, elastic and flexible plates or sheets. The polymers, such as polyethylenes, are also well suited for working in extrusion presses or for injection molding. In molten state they can be spun into threads by the methods usually employed for spinning superpolyamide threads. They may be cold drawn and may be drawn in this manner into ribbons, wires, or filaments of high elasticity and strength such as have never been obtained with prior known polyethylenes. Already in the working, they show a remarkable tendency toward fiber formation. The threads produced from these products can be used for industrial purposes. The products can be spun to form filaments in the molten state by the methods which are conventional for the spinning of super polyamide fibers such as Nylon fibers. These filaments can be employed as fibers for industrial purposes.

In copolymers produced according to the invention, either the alpha-olefin or the other monomer or monomers may predominate in the copolymer molecule. Thus, we have produced copolymers of propylene and ethylene containing, by weight in the polymer molecule, 10% of propylene and 90% of ethylene.

We have also produced copolymers containing, in the polymer molecule, 30% of isobutylene and 70% of ethylene. Copolymers containing in the polymer molecule, 50% of propylene and 50% of ethylene have been prepared by the method described herein. Copolymers containing up to 70% ethylene and up to 30% propylene are contemplated.

The following examples are given by way of illustration and not limitation, all operations involving the handling or obtaining of normally pyrophorus materials or of those tending to be pyrophorus and especially the catalyst combinations being carried out in an inert atmosphere such as $N_2$, as is conventional practice in the art.

EXAMPLE 1

Twenty g diethylaluminum chloride are mixed carefully with 1 g titanium tetrachloride, in which connection this solution assumes a brown color and a precipitate deposits. 200 cc air-dry hexane is added (all such operations being carried out under nitrogen); this, including the precipitate, is then transferred into a 500 cc autoclave and ethylene is forced in under a pressure of 100 atm. Upon shaking, the contents of the autoclave spontaneously become heated to 60°–70° C., and at the same time the ethylene pressure slowly drops. The addition of ethylene is repeated together with shaking three or more times. After shaking for a total of 10 hours, the ethylene has disappeared practically completely and the autoclave is filled with a paste consisting of the solvent used and a white ethylene polymer. The entire reaction mixture is stirred with methyl alcohol in order to decompose the aluminum compound, followed by suction filtering, washing with methyl alcohol and treatment finally at about 100° C. with dilute nitric acid. The polyethylene obtained is again washed thoroughly, filtered and dried. In this way, there is directly obtained a snow-white polyethylene suitable for use as molding powder, the softening point of which is about 150° C. This material can be excellently molded into transparent foils which can also be stretched.

The example is repeated using in place of the diethyl-aluminum monochloride the same quantity of so-called sesquichloride. The yield of polyethylene corresponds precisely to the total quantity of monomeric ethylene which has disappeared.

EXAMPLE 2

Example 1 is repeated but after the addition of the hexane, ethylene is introduced under a pressure of 1 atm. with stirring. The solution spontaneously becomes heated to about 40° C. Even during the stirring, the difficulty soluble polyethylene precipitates. The introduction of the ethylene is continued until the mass has become a paste which can scarcely be stirred any longer and it is thereupon worked up in the manner described in Example 1. The conversion into polyethylene of the ethylene consumed is quantitative. The ethylene consumption can be easily determined by a simultaneous measurement of the ethylene flowing into the apparatus and the ethylene leaving the apparatus. The experiment can be carried out on as large a scale as desired. Furthermore it can without difficulty be carried on with recycled ethylene.

EXAMPLE 3

Ten cc dimethylaluminum monobromide and 1.1 g anhydrous ferric chloride were first of all mixed cold, in which connection no reaction could be noted, and then heated for 5 hours at 160° C. The polymerization catalyst prepared in this manner was added, with the exclusion of air, together with 22 cc of hexane into a 500 cc autoclave, whereupon 98 g ethylene were introduced under pressure. The autoclave is heated while shaking to 100° – 110° C. and the pressure first of all rises to 230 atm. and then drops within about 70 hours to 32 atm. After cooling, the remaining pressure is let off, 9 g of ethylene escaping in gaseous form. The contents of the autoclave consist of a paste-like suspension of a solid polyethylene in hexane, which at first still has a dark color due to traces of the iron-containing catalyst but, after the suction filtering and treatment with methyl-alcoholate hydrochloric acid, it becomes pure white. There are finally obtained 84 g of a snow-white polyethylene of high melting point which can be molded into excellent foils at 150° – 170° C.

EXAMPLE 4

Ten cc diethylaluminum monochloride and 1.3 g anhydrous ferrous chloride plus 70 cc hexane were mixed together cold under nitrogen, and then intensively ground for two hours in a ball mill. There then formed a light brown suspension of a solid substance in the hexane which was introduced, under nitrogen, into a 200 cc autoclave. 39 g ethylene were then added under pressure, followed by heating to 110° C. with shaking. The autoclave pressure at room temperature at the beginning of the experiment was 50 atm. Upon the heating, the pressure rose only to about 80 – 90 atm. and even after 4 hours at 100° C. was still only 30 atm. After a further 21 hours the pressure was still 20 atm. at 110° C. The experiment was completed in the same manner as described in Example 3. There were obtained 13 g solid polyethylene in addition to 17 g recovered ethylene.

The example was repeated with the ferrous chloride replaced by the equivalent quantity of ferric acetylacetonate. The course of the experiment is similar to that described in Example 3.

EXAMPLE 5

Fifteen cc diisobutylaluminumchloride and 1.2 g anhydrous nickelous chloride were mixed cold in the same manner as described in Example 3 and then heated for 5 hours at 160° C. There was observed in this connection a slight evolution of gas and a blackening of the brown nickelous chloride. This mixture was then introduced together with 70 cc of hexane under nitrogen into a 200 cc autoclave and 45 g ethylene were introduced under pressure. The autoclave was thereupon heated while shaking to 100° –110° C., the pressure rose at the start to 240 atm. and then dropped over the course of 70 hours to 120 atm. After cooling 31 g of ethylene were recovered and 5 g of solid compact polyethylene remained in the autoclave. The polymerization catalyst is substantially more active and the polymerization takes place better if, instead of the initial combined heating, the dialkylaluminum monochloride is ground with anhydrous nickelous chloride in hexane.

The example was repeated with the nickelous chloride replaced by cobalt chloride and the same results were obtained.

EXAMPLE 6

To 10 cc dibutylaluminum fluoride there were added 0.5 g anhydrous palladous chloride followed by intensive grinding in a ball mill for 5 hours together with 70 cc of hexane with the exclusion of air. To the suspension produced, there was then added in a 200 cc autoclave 40 g of ethylene and the contents of the autoclave were heated while shaking at 100° – 110° C., the pressure rising initially to 150 atm. and dropping over the course of 50 hours to 10 atm. After cooling, 5 g of ethylene were recovered. There remained in the autoclave 35 g of a finely pulverulent polyethylene which at first was still suspended in hexane and which was further worked up in the manner described in Example 3.

EXAMPLE 7

Ten cc diethylaluminum monochloride were mixed under nitrogen with 1 g anhydrous manganous chloride and 20 cc hexane. This was followed by grinding for 2 hours in a ball mill. 83 g ethylene were then added under nitrogen to the suspension produced in this manner in a 500 cc autoclave. The autoclave was then heated while shaking to 100° C., the pressure rising to 80 atm. After 60 hours, the pressure had dropped to 15 atm. After the cooling of the autoclave, 8 g of ethylene were recovered. There remained in the autoclave a finely pulverulent pasty mass of 62 g polyethylene suspended in hexane. The further working was effected in the manner described in Example 3.

EXAMPLE 8

Example I was repeated using 20 g methoxydimethylaluminum in place of the diethylaluminum chloride (prepared in accordance with the method of A. V. Grosse and J. M. Mavity, Journal of Organic Chemistry, Volume 5 (1940), page 118) and 2 g zirconium tetrachloride in place of the titanium tetrachloride. The experiment had a course similar to that described in Example 1.

EXAMPLE 9

To 10 g diethylaluminum hydride 2 g anhydrous sublimated chromium chloride ($CrCl_2$) are added in 200 cc of a Diesel oil from the Fischer-Tropsch synthesis of a boiling point of 280° – 300° C. which is saturated by hydrogenation and distilled over sodium. A vigorous reaction takes place with darkening of the color and evolution of gas. The catalyst, under the conditions described in Example 1, also leads to a high-grade polyethylene.

EXAMPLE 10

To 25.8 g aluminumtriphenyl there are added with the exclusion of air, 68 g finely pulverized anhydrous aluminum chloride, followed by uniform thorough melting for 1 hour in an oil bath with heating, in which connection diphenylaluminum monochloride forms. The product is dissolved in hexane and thereupon 5 g solid anhydrous tungstenhexachloride are added. Reaction takes place with vigorous heating and darkening of the color, with the formation of the polymerization catalyst. The mixture prepared in this manner is excellently suited for the polymerization of ethylene under the conditions described in Example 1. There can similarly also be used diphenylaluminum monobromide such as described by A. V. Grosse and J. M. Mavity in the Journal of Organic Chemistry, Volume 5, Page 117 (1940).

EXAMPLE 11

To 4.8 g (26.8mmols) diethylaluminumphenolate in 100 cc hydrogenated Fischer-Tropsch Diesel oil which had been distilled over sodium, 0.3 cc (2.7mmols) titanium tetrachloride is added while stirring. The catalyst mixture is diluted to 750 cc and ethylene under a pressure of 5 atm. is introduced with intensive stirring into the orange-colored solution. Starting at about 40° C. polymerization of the ethylene can be noted with a brown discoloration of the solution (precipitate). Within 5 to 6 hours, there are obtained about 40 g polyethylene.

EXAMPLE 12

To a solution of 4.06 g (24mmols) piperidyldiethylaluminum in 40 cc hydrogenated Fischer-Tropsch Diesel oil which had been distilled over sodium there are added 0.46 g (2.4mmols) titanium tetrachloride while stirring. The solution in this connection assumes a reddish color and a brown precipitate deposits. By heating to 80° C. the depositing of the precipitate is completed, the precipitate having a blackish brown color while the superjacent solution is a yellowish-brown. The catalyst mixture obtained in this manner (solution and precipitate) is introduced into a 200 cc autoclave and 20 g of ethylene is forced in at pressure of 30 atm. Upon heating to 60° – 70° C. and shaking for a total of 24 hours, the ethylene pressure decreases. Thereupon there can be obtained from the autoclave, after the excess ethylene (5 g) has been let off, a brown paste from which the ethylene polymer (about 15 g) can be obtained in the form of a snow-white powder by decomposing the catalyst compound with methyl alcoholic hydrochloric acid followed by washing with acetone. The piperidyldiethyl-aluminum is prepared in the following manner:

To 1 mol aluminum triethyl there is slowly added, drop by drop, at room temperature while stirring and with the exclusion of air and moisture 1 mol of completely dry piperidine. In this connection, the temperature rises to about 50° C., and an addition compound is first formed. By thereupon carefully heating to 120° – 140° C., this addition compound of aluminum triethyl on piperidine is decomposed with the splitting off of ethane. The piperidyldiethylaluminum is thus obtained as colorless viscous liquid which can be distilled in a high vacuum (95° – 100° C., $10^{-3}$ mm Hg) which liquid becomes completely and thoroughly crystalline upon cooling with ice water. It has a melting point of 44° – 45° C.

EXAMPLE 13

Fifty-eight one-hundredths of a gram (2.5mmols) zirconium tetrachloride are shaken together with 4 cc dimethylaminodiethylaluminum in 50 cc hexane under nitrogen for 3–4 hours in a ball mill. The catalyst suspension obtained (light brown liquid and brown precipitate) is introduced into a 200 cc autoclave. After the introduction under pressure of ethylene (20 g) the autoclave is shaken for about 50 hours while heating to 100° – 120° C. After the excess ethylene (5 g) has been let off, ethylene polymer (about 15 g) can be isolated. The further working is effected in the same manner as indicated in Example 12. The dimethylaminodiethylaluminum is prepared in the following manner:

Into 1 mol aluminum diethylhydride in 100 cc pentane, there is introduced slowly while stirring at room temperature 1 mol of dimethylamine. As a result of the heat of reaction, the pentane boils and 1 mol hydrogen is liberated. After the solvent is evaporated off, the dimethylaminodiethylaluminum distills over at a pressure of 0.15 mm Hg and 66° C. By cooling in ice water it can be obtained in crystalline form (solidification point 5° –6° C.).

EXAMPLE 14

Eleven and four-tenths g (78mmols) ethylmercaptyldiethylaluminum in 50 cc hexane are carefully mixed with 1.48 g (7.8mmols) titanium tetrachloride. The brownish-black catalyst solution is introduced into a 200 cc autoclave and after the addition of ethylene under pressure (about 30 atm.) heated while shaking to 50° – 60° C. The ethylene pressure drops completely within 5 – 6 hours. The ethylene polymer (15 g) removed from the autoclave is further worked in the same manner as indicated in Example 12.

The ethylmercaptyldiethylaluminum is prepared as follows:

1 mol ethylmercaptan is slowly introduced at room temperature into 1 mol of aluminum triethyl while stirring, with the exclusion of air and moisture. In this connection, the corresponding quantity of ethane is immediately developed by the spontaneous heating of the mixture. After a short subsequent heating the ethylmercaptyldiethylaluminum can be obtained by distillation in a water-jet vacuum (160/2° C., 12 mm Hg) in the form of a colorless, readily movable liquid.

Figure 2:
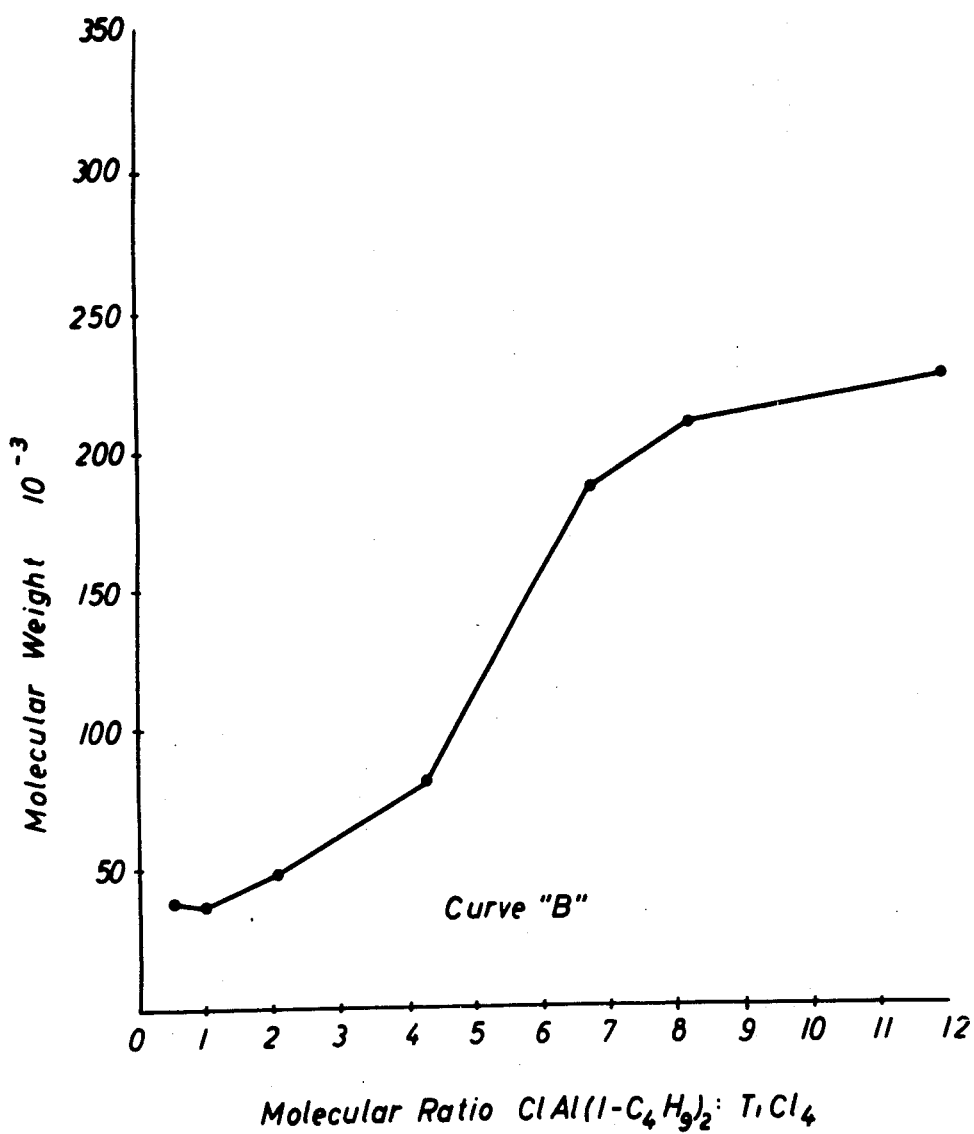

An exemplification of the sensitive range of different mol ratios for a specific catalyst combination is for instance furnished by the curves "A" and "B" of FIGS. 1 and 2. The same are based on the results of a number of polymerization experiments with, for instance, ethylene, the organo metal compound, as for instance Al diethyl or di-isobutyl chloride and the heavy metal compound such as titanium tetrachloride, using different mol ratios. The various above examples can each be used for the obtaining of graphs each representing its specific metal organo compound — heavy metal system.

The amount of organo metal compound necessary for each graph definition is preferably initially dissolved or finely dispersed in 250 cc of Diesel oil distilled with sodium and having a boiling point of 180° - 240° C., the said oil being produced by carbon monoxide hydrogenation according to Fischer-Tropsch. In all cases the same amount of heavy metal compound, such as for titanium tetrachloride, 4.75 g thereof is added dropwise at room temperature while stirring.

In addition, 2.25 liters of the said Diesel oil are saturated with ethylene in a closed stirrer-type apparatus filled with nitrogen and then the catalyst solution is run in. If the heavy metal compound does not readily lend itself to dropwise addition, or where it is otherwise desirable, the same may be added in organic solvent and preferably hydrocarbon such as said Diesel oil solution. In that event the amount of solvent in such solution is to be calculated as part of the specified total solvent, i.e. specifically as part of the total 2500 cc Diesel oil used.

By starting, for example, (FIG. 1, Table 1) with 12 mols of organo metal compound per mol of titanium tetrachloride and then reducing in stages the amount of organo metal compound used while keeping the amount of titanium tetrachloride constant, the influence of this step on the molecular weight of the polymers obtained may be initially slight (Section "a" of curve). In that case a relatively slight increase in the average molecular weight of the polyethylene occurs up to a ratio of about 3:1. Thence to a ratio of 2:1, the molecular weight decreases relatively strongly to the region of 268,000 under the conditions set out above (Section "b" of curve). A "steep" range then follows (Section "c" of curve) in which small changes in the ratios exert an appreciable influence on the molecular weight of the polymers obtained. If a ratio of 2 Me : 1 Ti is initially used and if the ratio is changed to 0.67:1, this causes a drop in the molecular weight from 268,000 to 24,000, so that it is possible to obtain any desired molecular weight between about 24,000 and 268,000 by a fine adjustment of the ratio between the organic aluminum compound and the titanium tetrachloride within this range "c" of the curve. In each case, the results obtained only apply for the specific experimental conditions used, since there are, as already mentioned, other factors which influence the molecular weight of the polymer. Depending on these other conditions, the polymerization curves, as for instance of the system represented by the examples herein, may plot differently and the starting point of the "steep" ranges may be shifted to different levels. For any given set of polymerization conditions and catalyst combination, however, if the molcular ratio of organo aluminum compound to heavy metal compound is reduced, a range such as the sensitive range, as for instance, "b"+"c" of curve "A" exists in which further changes in molecular ratio permit an extraordinarily sensitive regulation within a relatively wide range of any desired predetermined molecular weight of the polymer. This is particularly true of range "c." In certain cases the entire "sensitive" range may be essentially composed of the "steep" portion of the curve such as section "c" of the curve.

TABLE 1

| No. of experiment | Molecular ratio ClAl (C$_2$H$_5$)$_2$ : TiCl$_4$ | Color of Catalyst | Yield after 4 hours reaction - g polyethylene | ($\eta$) dl/g | Average molecular weight of polyethylene |
|---|---|---|---|---|---|
| 1. | 12.0 | dark brown | 470 | 7.5 | 302,000 |
| 2. | 6.0 | dark brown | 500 | 7.65 | 309,000 |
| 3. | 3.0 | brownish-red | 480 | 7.85 | 318,000 |
| 4. | 2.0 | reddish-brown | 400 | 6.8 | 268,000 |
| 5. | 1.7 | reddish-brown | 440 | 6.7 | 262,000 |
| 6. | 1.5 | reddish-brown | 450 | 5.15 | 188,000 |
| 7. | 1.3 | reddish-brown | 450 | 3.75 | 132,000 |
| 8. | 1.0 | reddish-brown | 510 | 1.87 | 54,000 |
| 9. | 0.67 | reddish-brown | 107 | 0.96 | 24,000 |

Curve "A" exemplifies also limits of the "sensitive" range in which the molecular weight of the polymer changes considerably with a relatively small change in molecular ratio as for instance between 0.67 : 1 and 3 : 1 and preferably 2 : 1 Any section of the curve defined by the curve portion between 0.67 and 3.0 mol ratios, corresponds to a greater molecular weight change per unit mol ratios than any section following 3.0. The limits are different for various combinations.

The essential feature of this "sensitive" range embodiment of the present invention does not consist so much in determining the accurate numerical limits of these sensitive ranges or the preferred "steep" portion thereof for each conceivable combination, as in the fundamental discovery that there is in fact such a sensitive range or "steep" portion. The position or scope of this range can be determined easily for any given combination by a small series of experiments and plotting the results of the experiments by means of curves. The values to be used for plotting molecular weight curves should be selected from a larger number of intermediate values to define the section termini of the corresponding curves.

Table 2 and curve "B" (FIG. 2) shows the results of experiments carried out with a diisobutyl aluminum chloride and titanium tetrachloride system. In this case, the sensitive range for influencing the molecular weight of the polyethylene is with molecular ratios between 0.5 : 1 and about 8 : 1. These results are also represented by curves in FIG. 2 of the accompanying drawings.

TABLE 2

| No. of experiment | Molecular ratio ClAl (i-C$_4$H$_9$)$_2$ : TiCl$_4$ | Color of catalyst | Yield after 50 minutes reaction - g. polyethylene | ($\eta$) dl/g | Average molecular weight of the polyethylene |
|---|---|---|---|---|---|
| 1. | 12.0 | Brownish-red | 155 | 5.92 | 225,000 |
| 2. | 8.2 | Brownish-red | 166 | 5.61 | 210,000 |
| 3. | 6.67 | Brownish-red | 178 | 5.10 | 186,000 |
| 4. | 4.25 | Brownish-red | 200 | 2.55 | 80,000 |
| 5. | 2.1 | Brownish-red | 340 | 1.64 | 46,000 |
| 6. | 1.0 | Brownish-red | 230 | 1.35 | 36,000 |
| 7. | 0.5 | Brownish-red | 156 | 1.37 | 37,000 |

Figure 3:
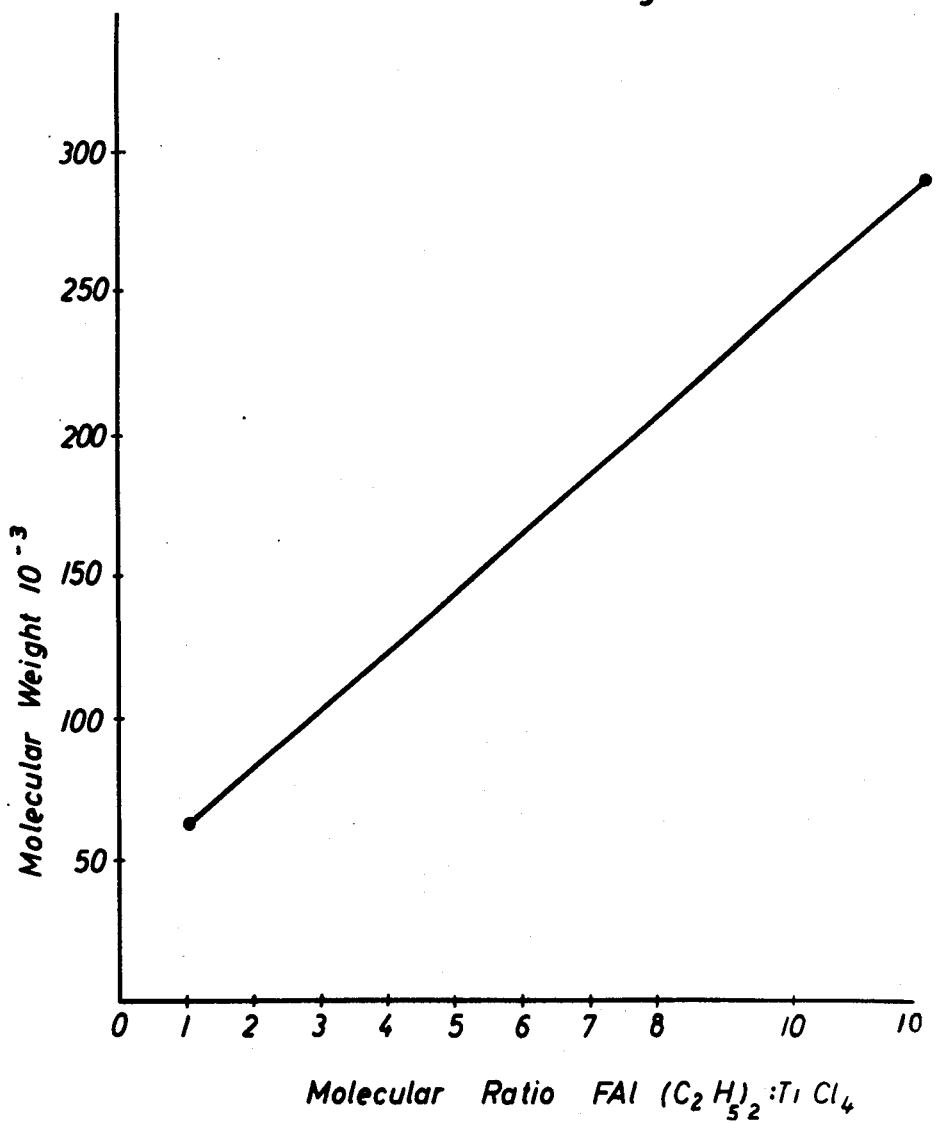

A typical example of a "steep" range section of a molecular weight variation curve is for instance that of the system diethyl aluminum fluoride-titaniumtetrachloride (Table 3, FIG. 3). For a molecular ratio of FAl(C$_2$H$_5$)$_2$/TiCl$_4$ of 12 : 1, a brown catalyst is obtained with a reaction time of 4 hours which upon contact with ethylene under the conditions of Example 3 gives a yield of about 415 g polyethylene. The average molecular weight of a polyethylene obtained with this 12 : 1 ratio is 290,000. On the other hand, when varying the mol ratios of the $FAl(C_2H_5)_2/TiCl_4$ to represent lesser amounts of the organo metal compound sharply decreasing molecular weights are obtained, so that at a ratio of 1 : 1, for which the color of the catalyst is reddish brown and the yield of polyethylene after 4 hours reaction time is 380 g, an average molecular weight of 62,000 is obtained.

Table 3 further illustrates a "steep" range section of another molecular weight variation curve (FIG. 4) as for instance exemplified by the system $CH_3OAl(C_2H_5)_2/TiCl_4$. In this case the 8 : 1 ratio produces a molecular weight of 306,000 and the 1.2 : 1 ratio a molecular weight of 110,000.

TABLE 3

| No. of Experiment | Molecular ratio | Color of catalyst | Reaction Time hrs. | Yield: g. of polyethylene | $(\eta)$ dl/g | Average molecular weight of polyethylene |
|---|---|---|---|---|---|---|
| 1 | 12 $FAl(C_2H_5)_2$ : $TiCl_4$ | Brown | 4 | 415 | 7.28 | 290,000 |
| 2 | 1 | Reddish-brown | 4 | 380 | 2.08 | 62,000 |
| 3 | 8 $CH_3OAl(C_2H_5)_2$ : $TiCl_4$ | Brown | 4 | 395 | 7.60 | 306,000 |
| 4 | 1.2 | Reddish-brown | 4 | 360 | 3.32 | 110,000 |

The products obtained in accordance with the invention are characterized by their inherent low melt index. The melt index as is well understood in the art, expresses the characterization of a moldable product to be relatively stable with respect to its viscosity within a relatively wide temperature range. In other words the viscosity — temperature curve — is relatively flat or less steep so that a desired degree of viscosity can be retained over a greater temperature range without the danger of a too great fluidity causing a "running away" condition.

Polyolefins and especially polyethylene prepared in accordance with the invention possess for molecular weights of a magnitude of about 50,000 to 60,000 a melt index not in excess of substantially about 1. With increasing molecular weights the melt index of the products in accordance with the invention are even lower, being, for instance, of a value of approximately less than 0.1 for molecular weights of a magnitude of approximately 100,000 to 120,000.

The effective or most effective utilization of various catalyst combinations applicable in accordance with the invention makes it in most cases desirable to use a relatively pure initial monomer. As above pointed out, if, for instance, ethylene contains certain impurities, these may inactivate portions of the heavy metal compound and/or the organo metal compound present in the solution and may thus undesirably shift the mol ratio initially present between the catalyst components. These difficulties, however, may be avoided if the ethylene or the gas mixture containing ethylene is preliminarily contacted or washed with organo metal compounds, preferably organic compounds of aluminum, before entering the reaction vessel in which it is to be contacted with the herein described catalyst material. When proceeding in this manner, the polymerization of the ethylene is actually carried out in two separate steps. The organo metal compound useable in the first step of the just described two-step procedure is preferably one corresponding to the general formula RAlXY or RMeY in which R is hydrogen or a hydrocarbon radical, X is R or OR', Y is R or OR', R' is a hydrocarbon radical and Me is a bivalent metal, preferably magnesium or zinc.

The following examples are furnished by way of further illustration:

EXAMPLE 15

The catalyst (prepared from 3.5 g diethyl aluminum chloride and 0.44 g titanium tetrachloride) is dissolved in 2.5 l. Diesel oil under an atmosphere of nitrogen, and a dried, oxygen free gaseous mixture of 12 vol. % propylene and 88 vol. % ethylene is introduced under atmospheric pressure. The vessel is heated to about 70° C and then, within 8 hours, the temperature is gradually raised to 90° C. A finely powdered, insoluble polymer separates, whereupon the contents of the vessel become progressively thicker. The reaction is stopped after 8 hours. About 168 g of a solid, colorless copolymer of ethylene and propylene is separated by filtration. That the product is a copolymer is shown by the infra-red spectrum. The spectra of the copolymer was compared with that of an ethylene homopolymer obtained in similar manner. In the range 1382 $cm^{-1}$ there appears for the copolymer an additional absorption band (indicated by the mark-x-in the absorption spectrum of the copolymer, FIG. 5 of the drawing) which is characteristic of methyl branching. The production of the copolymer is also evidenced by careful quantitative determination of the amounts of ethylene and propylene in the gases released from the reaction vessel and condensed by cooling. It is thus readily ascertained that about 10% by weight propylene is contained in the polymer molecule.

EXAMPLE 16

Example 15 is repeated, except that the mixture of Diesel oil and catalyst is diluted with 250 ml of 1-vinylcyclohexene-4 (obtained by thermal dimerization of butadiene). Pure ethylene is then pumped in and the polymerization is conducted as described for ethylene in accordance with the preceeding examples.

After 9 hours, 120 of a polymer is formed. Superficially, it resembles polyethylene. However, the results of infra-red analysis show the presence of cyclohexene radicals in the polymer molecule. Thus, a film of the product having a thickness of 120–140 microns shows an infra-red absorption band at 658 $cm^{-1}$ which is not found in the infra-red spectrum of the similarly prepared homopolymer, polyethylene. Said band is characteristic of the double bond in the cyclohexene ring. This infra-red absorption is not due to the presence of a residual portion of vinylcyclohexene dissolved in the polymer, but is due to acceptance of the vinylcyclohexene into the polymer molecule, as shown by the fact that the infra-red absorption spectrum of the polymerizate does not show the very characteristic band of the vinyl group initially present in the unpolymerized vinylcyclohexene molecule. A copolymer is thus obtained, built up of units derived from both ethylene and vinylcyclohexene, the units derived from ethylene predominating. As compared to polyethylene, the copolymer has distinctly increased strength and a higher softening temperature. Apparently, it is moderately cross-linked through branches formed by the unsaturated cyclohexene side chains.

We claim:

1. Method for the production of high molecular polymers which comprises contacting an alpha-olefin with a catalyst formed by a mixture of a first and second component, said first component essentially consisting of an aluminum compound of the general formula RR'AlX, in which R and R' are each a member selected from the group consisting of hydrogen, alkyl radicals and aryl radicals, and X is a member selected from the group consisting of hydrogen, halogen atoms, alkoxy radicals, and aryloxy radicals, said second component essentially consisting of a non-ionized heavy metal compound selected from the group consisting of salts and freshly precipitated oxides and hydroxides of metals of Groups IV-B, V-B and VI-B of the Periodic System including thorium and uranium, metals of Group VIII of the Periodic System and manganese, and recovering the high molecular polymer formed.

2. Method according to claim 1 in which said catalyst is a catalyst formed by a mixture of said first and second components in an organic solvent with at least one of said first and second components in solution in said solvent.

3. Method according to claim 1, in which said alpha-olefin is in the form of a mixture of alpha-olefins.

4. Method according to claim 3 in which one of said alpha-olefins is ethylene.

5. Method according to claim 1 in which said contacting is effected at a temperture between about room temperature and 150° C and a pressure between about atmospheric and about 100 atmospheres above atmospheric pressure.

6. Method according to claim 1 in which said first component is a dihydrocarbon aluminum compound.

7. Method according to claim 1 in which said first component is a dialkyl aluminum monohalide and in which said second component is a compound of a metal of Group IVB of the Periodic System.

8. Method according to claim 1 in which said first component is a dialkyl aluminum monohalide and in which said second component is a compound of a metal of Group VB of the Periodic System.

9. Method according to claim 1 in which said first component is a di-alkyl aluminum monohalide and in which said second component is a compound of a metal of Group VIB of the Periodic System.

10. Method according to claim 1, in which first component is a dialkyl aluminum halide and said second component is a titanium halide.

11. Method according to claim 10, in which said titanium halide is a titanium chloride.

12. Method according to claim 1, in which said first component is a diethyl aluminum chloride, and in which said second component is a titanium chloride.

13. Method according to claim 1, in which said alpha-olefin is ethylene.

14. Method according to claim 1, in which said alpha-olefin is in the form of a mixture of ethylene with a higher homolog of ethylene.

15. Method according to claim 14, in which said first component is a dialkyl aluminum monohalide and said second component is a titanium chloride.

* * * * *

UNITED STATES PATENT AND TRADEMARK OFFICE
CERTIFICATE OF CORRECTION

PATENT NO. : 4,125,698
DATED : November 14, 1978
INVENTOR(S) : Karl Ziegler et al.

It is certified that error appears in the above-identified patent and that said Letters Patent are hereby corrected as shown below:

Title page, Assignee, for "Mulehim" read --Mulheim--;
Column 1, line 29, for "trialkyls" read --use--;
Column 1, line 30, for "moledular" read --molecular--;
Column 1, line 54, for "hydrocarbons" read --hydrocarbon--;
Column 3, line 22, for "fom" read --from--;
Column 4, line 9, for "wtih" read --with--;

Column 5, line 26, for "wih" read --with--

Column 5, line 59, for "acetayl" read --acetyl--;

Column 10, line 62, for "uaing" read --using--;
Column 21, line 33, (claim 5, line 2), for "temperture" read Signed and Sealed this Fifteenth Day of May 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,125,698
DATED : November 14, 1978
INVENTOR(S) : Karl Ziegler et al.

It is certified that error appears in the above-identified patent and that said Letters Patent are hereby corrected as shown below:

Column 4, table, Substance No. 6, 2nd column, for "abs. 165" read --abt. 165--;

Column 5, line 35, for "halogenalkyls" read --halogenated alkylenes--;

Signed and Sealed this

Fourth Day of September 1979

[SEAL]

Attest:

LUTRELLE F. PARKER
Attesting Officer    Acting Commissioner of Patents and Trademarks

REEXAMINATION CERTIFICATE (973rd)
United States Patent [19]
Ziegler et al.

[11] B1 4,125,698
[45] Certificate Issued Dec. 27, 1988

[54] POLYMERIZATION OF ETHYLENICALLY UNSATURATED HYDROCARBONS

[75] Inventors: Karl Ziegler; Heinz Breil; Heinz Martin; Erhard Holzkamp, all of Mulheim an der Ruhr, Fed. Rep. of Germany

[73] Assignee: Studiengesellschaft Kohle M.b.h., Mulehim, an der Ruhr, Fed. Rep. of Germany

Reexamination Request:
No. 90/001,355, Oct. 16, 1987

Reexamination Certificate for:
Patent No.: 4,125,698
Issued: Nov. 14, 1978
Appl. No.: 770,484
Filed: Oct. 29, 1958

Certificate of Correction issued May 15, 1979.

Related U.S. Application Data

[63] Continuation of Ser. No. 482,412, Jan. 17, 1955, abandoned, and Ser. No. 527,413, Aug. 9, 1955, abandoned, and Ser. No. 514,068, Jun. 8, 1955.

[30] Foreign Application Priority Data

| Date | Country | Number |
|---|---|---|
| Nov. 17, 1953 [DE] | Fed. Rep. of Germany | Z 3799 |
| Dec. 15, 1953 [DE] | Fed. Rep. of Germany | Z 3862 |
| Dec. 23, 1953 [DE] | Fed. Rep. of Germany | Z 3882 |
| Jan. 19, 1954 [DE] | Fed. Rep. of Germany | Z 3941 |
| Aug. 3, 1954 [DE] | Fed. Rep. of Germany | Z 4348 |
| Aug. 16, 1954 [DE] | Fed. Rep. of Germany | Z 4375 |
| Dec. 11, 1954 [DE] | Fed. Rep. of Germany | Z 4603 |
| Dec. 13, 1954 [DE] | Fed. Rep. of Germany | Z 4604 |

[51] Int. Cl.$^4$ ............... C08F 4/64; C08F 4/66; C08F 10/00
[52] U.S. Cl. ............... 526/159; 526/95; 526/103; 526/105; 526/107; 526/164; 526/169.1; 526/169.2; 526/169
[58] Field of Search ............... 526/159, 169, 169.1, 526/95, 103, 105, 107, 169.2

[56] References Cited

U.S. PATENT DOCUMENTS

| | | | |
|---|---|---|---|
| 2,372,001 | 3/1945 | Joyce | 526/348 |
| 2,388,160 | 10/1945 | Krase | 526/352.2 |
| 2,699,457 | 1/1955 | Ziegler et al. | |
| 3,008,943 | 11/1961 | Guyer | 260/93.7 |
| 3,051,690 | 8/1962 | Vandenberg | 260/88.2 |
| 3,252,960 | 5/1966 | Tornqvist et al. | 260/93.7 |
| 4,125,698 | 11/1978 | Ziegler et al. | 526/159 |

FOREIGN PATENT DOCUMENTS

| | | |
|---|---|---|
| 538782 | 12/1955 | Belgium . |
| 540459 | 2/1956 | Belgium . |
| 874215 | 4/1953 | Fed. Rep. of Germany . |
| 682420 | 11/1952 | United Kingdom . |

*Primary Examiner*—Edward J. Smith

[57] ABSTRACT

Method for the polymerization of alpha-olefins, e.g., ethylene and its higher homologs, to produce high molecular weight polymers by contacting the alpha-olefin or an alpha-olefin mixture to be polymerized with a catalyst formed from a mixture of a first and second component, the first component essentially consisting of a dialkyl, diaryl organoaluminum compound, or aluminum hydride, and preferably a dialkyl aluminum halide, e.g., diethyl aluminum chloride, and the second component essentially consisting of a salt, freshly precipitated oxide or hydroxide of a Group IVB, VB, VIB or VIII of the Periodic System, and most preferably a salt, such as titanium chloride.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-15 is confirmed.

* * * * *